(12) United States Patent
Grieb et al.

(10) Patent No.: US 10,132,429 B2
(45) Date of Patent: Nov. 20, 2018

(54) CONNECTING CLIP HAVING A METAL WIRE MAT AS A DAMPING ELEMENT

(71) Applicant: Siemens Aktiengesellschaft, Munich (DE)

(72) Inventors: Thomas Grieb, Krefeld (DE); Bernd Prade, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 15/315,507

(22) PCT Filed: Jun. 5, 2015

(86) PCT No.: PCT/EP2015/062578
§ 371 (c)(1),
(2) Date: Dec. 1, 2016

(87) PCT Pub. No.: WO2015/189105
PCT Pub. Date: Dec. 17, 2015

(65) Prior Publication Data
US 2018/0187799 A1    Jul. 5, 2018

(30) Foreign Application Priority Data

Jun. 13, 2014    (EP) ..................................... 14172266

(51) Int. Cl.
*F16L 3/00* (2006.01)
*F16L 3/21* (2006.01)
(Continued)

(52) U.S. Cl.
CPC ................ *F16L 3/21* (2013.01); *F02C 7/222* (2013.01); *F16L 3/1083* (2013.01); *F16L 3/237* (2013.01);
(Continued)

(58) Field of Classification Search
CPC . F16L 3/21; F16L 3/1083; F16L 3/237; F16L 55/035; F02C 7/222
(Continued)

(56) References Cited

U.S. PATENT DOCUMENTS 1,262,763 A * 4/1918 Farley ...................... F16L 3/14
                                                    248/62
2,396,925 A * 3/1946 Morehouse ............. F16L 3/223
                                                   174/40 CC
(Continued)

FOREIGN PATENT DOCUMENTS

CN    102859078 A    1/2013
DE    1625350 A1    5/1970
(Continued)

OTHER PUBLICATIONS

JP Office Action dated Feb. 19, 2018, for JP patent application No. 2016570819.
(Continued)

*Primary Examiner* — James Hook
(74) *Attorney, Agent, or Firm* — Beusse Wolter Sanks & Maire

(57) ABSTRACT

A connecting clip for connecting two pipelines, having a first clip arm, which is designed to extend at least partially around a circumference of a first pipeline, and a second clip arm, which is designed to extend at least partially around a circumference of a second pipeline. The first and the second clip arm are connected to one another in a damping manner, and at least one metal mat is provided as damping element.

15 Claims, 2 Drawing Sheets

(51) Int. Cl.
   *F16L 3/10* (2006.01)
   *F16L 3/237* (2006.01)
   *F16L 55/035* (2006.01)
   *F02C 7/22* (2006.01)

(52) U.S. Cl.
   CPC ........ *F16L 55/035* (2013.01); *F05D 2220/32* (2013.01); *F05D 2260/30* (2013.01); *F05D 2260/96* (2013.01); *F05D 2300/614* (2013.01)

(58) Field of Classification Search
   USPC .................. 138/106, 107; 248/67.7, 68.1
   See application file for complete search history.

(56) References Cited

U.S. PATENT DOCUMENTS

| | | | | |
|---|---|---|---|---|
| 2,413,772 | A * | 1/1947 | Morehouse | F16L 3/1233 24/336 |
| 3,599,915 | A * | 8/1971 | Soltysik | F16B 2/065 248/68.1 |
| 3,778,184 | A * | 12/1973 | Wood | F01D 9/042 415/119 |
| 4,457,499 | A * | 7/1984 | Townsend | E02D 13/10 267/137 |
| 5,060,810 | A * | 10/1991 | Jones | A47F 7/0035 211/4 |
| 5,190,251 | A | 3/1993 | Bodo | |
| 6,241,198 | B1 * | 6/2001 | Maruyama | F16L 3/223 248/49 |
| 2002/0066835 | A1 * | 6/2002 | Sentpali | F16B 2/12 248/68.1 |
| 2007/0284485 | A1 * | 12/2007 | Kato | F16L 3/223 248/68.1 |
| 2010/0263762 | A1 | 10/2010 | Abram | |
| 2013/0048826 | A1 * | 2/2013 | Go | E02F 9/2275 248/560 |
| 2014/0252179 | A1 | 9/2014 | Go et al. | |

FOREIGN PATENT DOCUMENTS

| | | |
|---|---|---|
| DE | 19716733 A1 | 10/1998 |
| DE | 102004021474 B3 | 3/2005 |
| DE | 202009008648 U | 9/2009 |
| EP | 2573277 A1 | 3/2013 |
| JP | S5879180 A | 5/1983 |
| JP | S5894969 A | 6/1983 |
| JP | S58103957 A | 6/1983 |
| JP | S6139443 A | 2/1986 |
| JP | H01153883 A | 6/1989 |
| JP | H11336715 A | 12/1999 |
| JP | H11351487 A | 12/1999 |
| JP | 2009052698 A | 3/2009 |
| WO | 2013058413 A1 | 4/2013 |

OTHER PUBLICATIONS

CN Office Action dated Sep. 8, 2017, for CN patent application No. 2015800314995.
EP Search Report dated Oct. 28, 2014, for EP application No. 14172266.0.
IPPR (PCT/IPEA 416 and 409) dated May 18, 2016, for PCT application No. PCT/EP2015/062578.

* cited by examiner

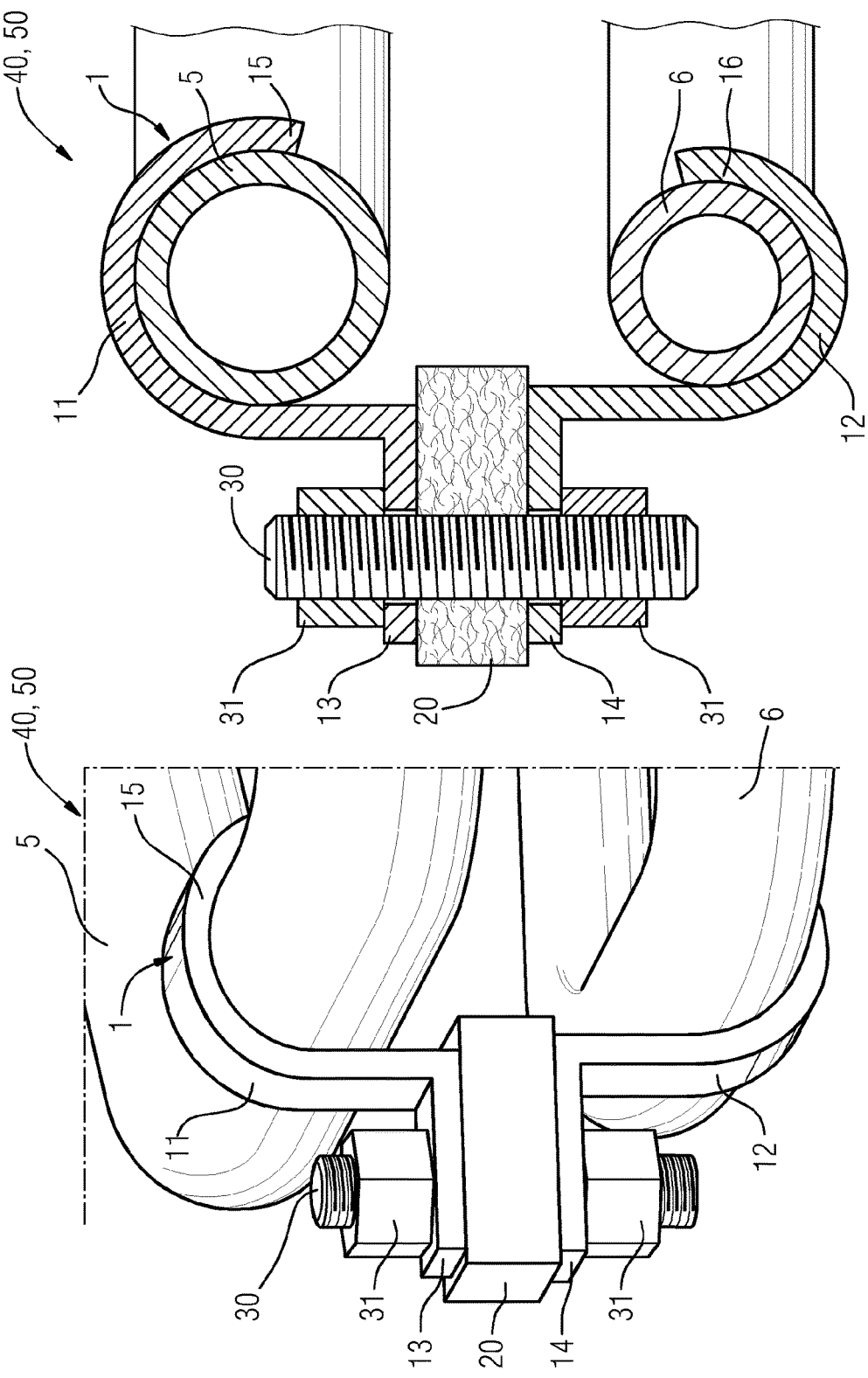

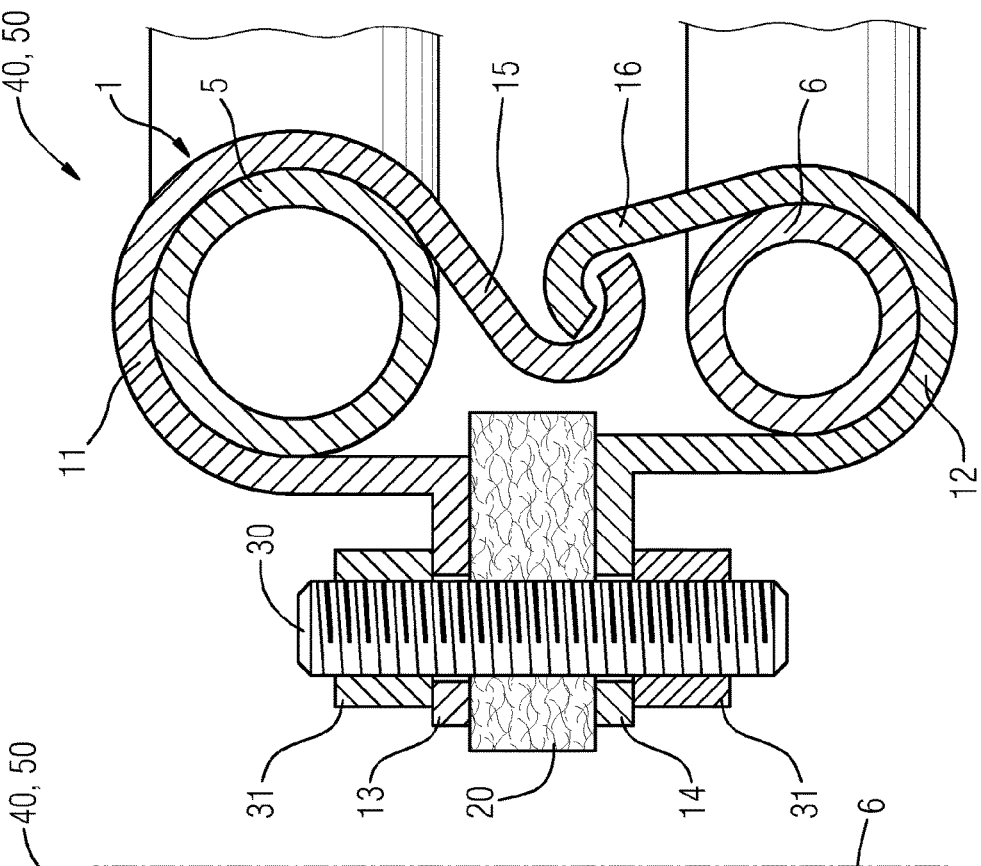
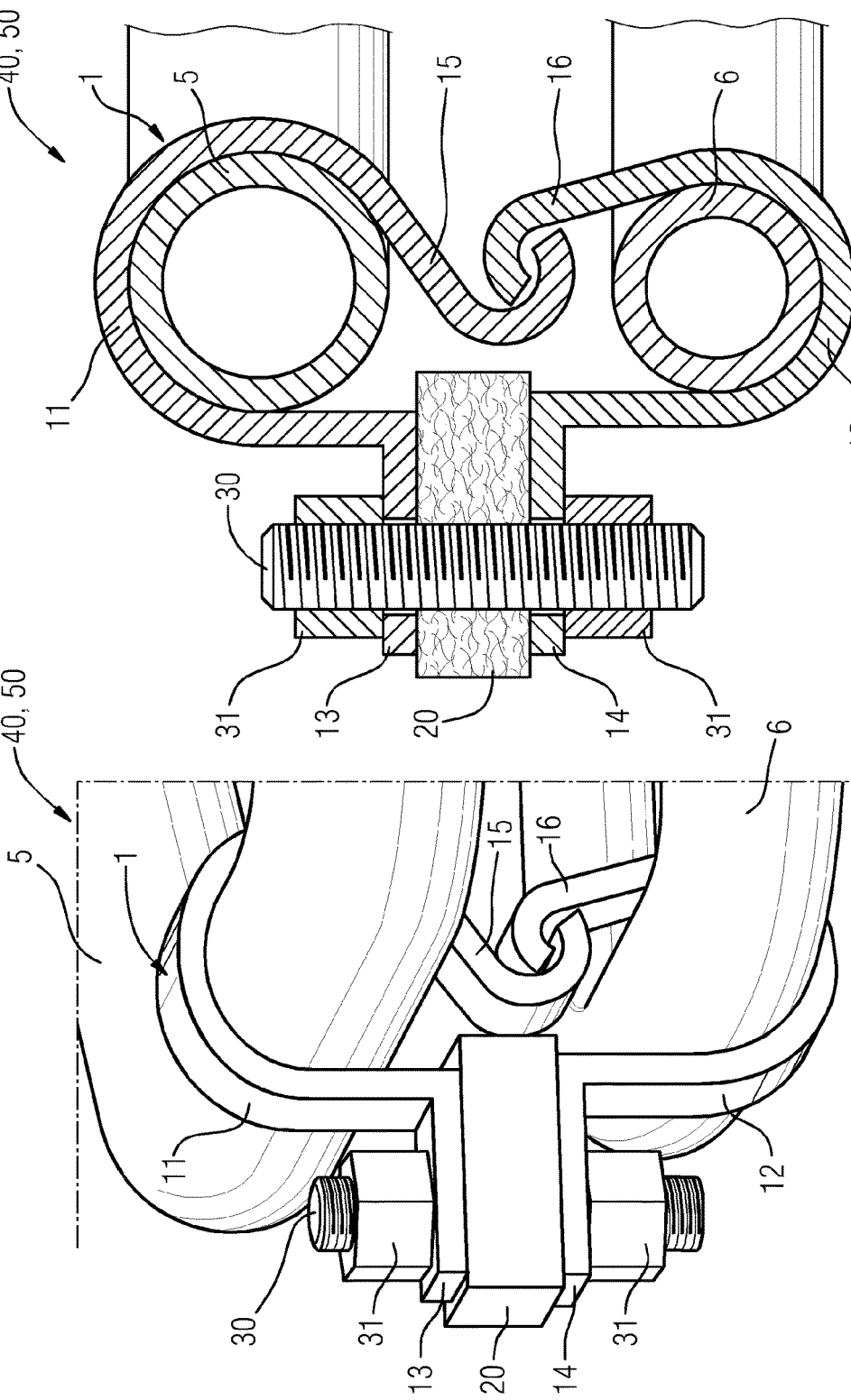

CONNECTING CLIP HAVING A METAL WIRE MAT AS A DAMPING ELEMENT

CROSS REFERENCE TO RELATED APPLICATIONS

This application is the US National Stage of International Application No. PCT/EP2015/062578 filed Jun. 5, 2015, and claims the benefit thereof. The International Application claims the benefit of European Application No. EP14172266 filed Jun. 13, 2014. All of the applications are incorporated by reference herein in their entirety.

FIELD OF INVENTION

The present invention relates to a connecting clip for connecting two pipelines, as well as a pipeline system.

BACKGROUND OF INVENTION

During operation of fluidic systems which comprise a number of pipelines, there are inter alia vibration movements in the pipelines owing to the changing pressure conditions therein. Forces which impact from outside the system or are produced by other components of the system can also contribute to these movements or even cause these movements, and thus contribute to setting the pipelines in vibration. As a result of the movements not only can damage occur in the pipelines themselves, but resonance vibrations can also build up by way of example which can lead to even greater damage to the system as a whole. By way of example during operation of gas turbines such vibration movements may occur in the pipelines of the external fuel supply. The vibration movements may then damage the welded seams on the pipelines, e.g. the welded seams between the angle members and the burner flange. If this leads to a breakdown in the welded seams it becomes necessary inter alia to switch off the entire gas turbine which leads to high standstill costs.

In order to prevent the vibration movements in pipelines of this kind pipe clips are typically used which connect a number of pipelines to one another. By way of example a damping material is provided between the pipe clips and the pipelines leading to a displacement of the vibration frequencies which are occurring and to an advantageous superimposition or coupling of the movements of individual pipelines. As a result of the damping by means of the damping element undesired movements, more particularly resonances, can be clearly reduced since vibration energy can be purposefully converted into other forms of energy.

In the case of fuel pipelines of a gas turbine for example silicon materials which are temperature-resistant up to a temperature of about 325° are used as damping elements. Since however during operation of a gas turbine the relevant pipelines sometimes reach this temperature range and may even exceed same the danger exists that the silicon material will break down.

SUMMARY OF INVENTION

It is thus an object of the invention to provide a suitable connecting clip which can be used even at higher temperatures, more particularly at 325° and above, without material fatigue. At the same time the connecting clip is to enable adequate damping of the movements of the pipelines so that the pipelines can be used safely.

This object on which the invention is based is achieved by a connecting clip as well as by a pipe system, a fuel pipe system as well as a gas turbine according to the claims.

More particularly the objects on which the invention is based are achieved by a connecting clip for connecting two pipelines, comprising a first clip arm, which is configured to run at least partially around a circumference of a first pipeline, and a second clip arm which is configured to run at least partially around a circumference of a second pipeline, wherein the first and second clip arms are connected to one another in a damping manner, and at least one metal wire mat plate is provided as the damping element.

The objects on which the invention is based are furthermore achieved by a pipe system comprising at least a first pipeline and a second pipeline which are both connected by means of a connecting clip according to the preceding and following descriptions.

Furthermore the objects on which the invention is based are achieved by a fuel pipe system of a gas turbine system comprising at least a first pipeline for conveying fuel and a second pipeline for conveying fuel which are connected by means of a connecting clip as described previously and below.

The objects on which the invention is based are likewise achieved by a gas turbine comprising a fuel pipe system of this kind.

The fundamental idea of the invention is to be seen in connecting two clip arms of a connecting clip to one another in a damping manner, wherein a metal wire mat is provided as the damping element. The metal wire mat consists here typically of a tangled mass of individually looped metal wires, wherein the metal wire mat when correspondingly biased by force causes friction of the individual wires in the compound structure. The tangled mass can naturally also be replaced by a textile structure of any kind, provided this causes a corresponding damping through friction of the individual wires when loaded with force. This friction leads to a loss of energy which converts mechanical energy into thermal energy. The metal wire mat is also thus suitable to complete an energy conversion of this kind at high temperatures when force is applied. Thus if the pipelines which are connected by the connecting clip are excited into vibration movements for example during pressure fluctuations of the operating medium in the pipelines, then these movements can be dampened after introducing a vibration force into the metal wire mat. Since the metal wire mat is thermally stable even at high temperatures, a vibration damping of this kind can be achieved even with high temperatures, more particularly even at temperatures of more than 325° C.

At this point it should be pointed out that the damping in the sense according to the invention is to be understood as mechanical damping in relation to a movement of the two clip arms or pipelines relative to one another. In other words, during movement of the two clip arms at least one part of the movement energy is converted into thermal heat through friction, so that during movement of the two clip arms or pipelines a mechanical damping can take place.

It is furthermore pointed out that a connection in the sense according to the invention does not require holding the two pipelines in the connecting clip, but a purely technical material connection. Thus the two pipelines can also by way of example be tensioned against one another by the connecting clip. The two pipelines are advantageously in direct contact with the two clip arms so that a force-fitting transfer of vibration energy from the pipelines into the clip arms can take place. The clip arms are furthermore advantageously made from a metallic material since this can likewise remain stable in thermally stressed applications.

According to a first embodiment of the invention it is proposed that the first clip arm is configured to run round more than half the circumference of the first pipeline and/or the second clip arm is configured in order to run over more than half the circumference of the second pipeline. The run in the circumferential direction then requires a suitable tracking of the circumferential surface of the pipelines so that the pipes can in practice be held in the clip arm without requiring further devices. As a result of the path round more than half the circumference of the respective pipeline the latter can be held in the respective clip arm without slipping out from the holder in the absence of any mechanical force being applied. An effective holding mechanism is consequently provided.

According to a further embodiment of the invention it is proposed that the first clip arm is connected in the region of one clip arm end to the second clip arm, likewise in the region of one clip arm end, wherein the two other ends of the two clip arms remain unconnected from one another. The ends of the clip arms here relate to the ends of the clip arms in the longitudinal direction of a material run. More particularly the two connected clip arms furthermore have a portion which in the connected form runs substantially parallel to the surface of the damping element, so that the force transfer during operation takes place on a larger surface area of the damping element. Furthermore in particular the two unconnected clip arm ends each hold one pipeline. A connection only in one region in which the two clip arm ends of different clip arms are connected to one another reduces the material costs and facilitates easier maintenance since the arrangement of the connecting region can be provided in an accessible region of the pipelines.

According to an alternative embodiment of the invention it is proposed that the first clip arm in the region of one clip arm end is connected to the second clip arm likewise in the region of one clip arm end wherein the two other clip arm ends of the two clip arms can be brought into a releasable hooked connection with one another. In other words the two other clip arm ends can be releasably hooked with one another. The hooked connection is more particularly by material bonding, i.e. the materials or the two clip arms contact one another with material bonding.

The hooked connection can furthermore be configured so that the two hooked clip arm ends have mutually matching flanges which after hooking engage in one another, and thus the two clip arm ends can be fastened to one another. The additional hooked connection at the clip arm ends which are associated with one another provide an additional fastening possibility by means of which the two pipelines can be connected to one another in an even better way.

As a result of the detachability of the hooked connection this can also be released again relatively rapidly when required so that for example a replacement of the connecting clip can be easily carried out when necessary.

According to a further design variation the first clip arm in the region of one clip arm end can likewise be connected to the second clip arm in the region of one clip arm end, wherein the two other clip arm ends of the two clip arms are likewise connected to one another in damped manner, and a least one metal wire mat, more particularly a further metal wire mat, is provided as the damping element. A two-sided damped connection of the clip arm ends can guarantee an improved damping action compared with an embodiment in which only one of the clip arm ends is provided only with damping.

It is furthermore proposed that the first clip arm in the region of the one clip arm end is connected to the second clip arm likewise in the region of the one clip arm end so that the two clip arms are provided connected to one another indirectly via the damping element at least in some regions. The two clip arms during movement of the respective pipelines will thus always introduce the motion energy directly into the damping element where the mechanical damping action can take place.

According to a further development of this embodiment it is proposed that the two connected clip arm ends have a recess through which a retaining pin runs for connecting them together. The retaining pin can be connected to the two clip arm ends in such a way that the latter furthermore have a motion play wherein the movement is dampened within the play by the damping element. The retaining pin furthermore ensures a secure connection of the two clip arms so that even with great vibration amplitudes an effective damping can take place. As an alternative to an embodiment of this kind the retaining pin can obviously also be firmly attached to one clip arm end so that the latter need not have any corresponding recess.

According to a further development of the invention the damping element can likewise have a hole through which the retaining pin runs. It can thereby be ensured that the damping element cannot drop out accidentally from the connecting clip and the connecting clip can consequently only execute inadequate or no damping.

According to a further embodiment the retaining pin can be configured as a threaded pin which is or can be tensioned with the two clip arm ends. Tensioning can be carried out whereby the ends of the threaded pin are each screwed to a nut until the two clip arm ends become tensioned. The threaded pin consequently permits a particularly simple cost-effective easily maintained embodiment of the retaining pin.

It is likewise conceivable according to an alternative embodiment that the retaining pin is configured as a screw. One such screw can be guided more or less loosely through the recesses of the two clip arms, or however can also be already fastened, such as welded, on one clip arm, or can be press-fitted with the clip arm. After correspondingly attaching the connecting clip to a pipeline system the screw can serve to tension the connecting clip and the pipeline system to one another. In order to assist the introduction of a screw which is firmly connected to a clip arm into the recess of the other clip arm, the recess of the other clip arm can also be configured as a slit.

The invention will now be explained in further detail with reference to the individual figures. It is pointed out here that the technical features in the figures which are provided with the same reference numerals are to have the same technical actions.

It is furthermore pointed out that the figures are to be considered as purely schematic and do not provide a limitation regarding the feasibility of the invention.

It is further pointed out that the invention is to be claimed in its entirety with any combination of the technical features illustrated below, where the embodiment which results can solve the problem on which the invention is based.

BRIEF DESCRIPTION OF THE DRAWINGS

In the drawings:

FIG. 1 shows a perspective view of a first embodiment of the pipeline system or fuel pipeline system according to the invention comprising a first embodiment of a connecting clip according to the invention;

FIG. 2 shows a lateral sectional view through the embodiment of the pipeline system or fuel pipeline system according to the invention shown in FIG. 1;

FIG. 3 shows a perspective lateral view of a vertical embodiment of a pipeline system or fuel pipeline system according to the invention comprising an embodiment of a connecting clip according to the invention;

FIG. 4 shows a lateral sectional view through the embodiment of the pipeline system or fuel pipeline system according to the invention shown in FIG. 3.

DETAILED DESCRIPTION OF INVENTION

FIG. 1 shows a first embodiment of the pipeline system 40 or fuel pipeline system 50 according to the invention which comprises an embodiment of the connecting clip 1 according to the invention. The fuel pipeline system 50 can also be a part of a gas turbine which is not shown in further detail. The connecting clip 1 has here a first clip arm 11 as well as a second clip arm 12 which each surround a first pipeline 5 and a second pipeline 6 respectively.

In order to connect the two clip arms 11, 12 a connection is provided by means of a retaining pin 30 at one clip arm end 13 of the first clip arm 11 as well as at one clip arm end 14 of the second clip arm 12. The respective clip arm ends 13, 14 have a suitable recess through which the retaining pin 30, which is configured as a threaded pin, is guided. At the same time a damping element 20, which is configured as a metal wire mat, is arranged between the two clip arm ends 13, 14. In order to tension the two clip arms with one another a nut 31 is screwed onto the end of the retaining pin 30 so that after applying a suitable force the respective clip arms 13, 14 are pressed against the damping element 20. In order to reach an improvement in the transfer of force from the clip arms 11, 12 to the damping element 20 the respective clip arm ends 13, 14 are shaped so that they run parallel at least in some areas along the surface of the damping element 20. More particularly the two clip arm ends 13, 14 thus also run parallel to one another.

The respective other clip arm ends 15, 16 of the first clip arm 11 and clip arm 12, respectively, each surround a pipeline 5, 6. The surround is achieved by material bonding so that the respective clip arms 11, 12 and clip arm ends 15, 16, respectively, follow the circumferential shape of the first pipeline 5 and second pipeline 6 respectively. If now by way of example as a result of pressure fluctuations during operation of the pipelines vibratory movements occur in the latter the mechanical forces are directed from the respective pipelines 5, 6 via the clip arms 11, 12 into the damping element 20. Since the damping element 20 is a metal wire mat the metal wires located therein are charged with corresponding movements which cause friction between the individual metal wires in the damping element 20. The friction which occurs leads to a breakdown in the mechanical energy and conversion into thermal energy. Damping is thus achieved.

FIG. 2 shows the embodiment of the pipeline system 40 or fuel pipeline system 50 according to the invention according to FIG. 1 in a lateral sectional view. It can clearly be seen here that the retaining pin 30 runs both through recesses at the clip arm ends 13, 14 and also through a hole in the damping element 20. The damping element 20 can consequently no longer drop out from the joint even in the event of unfavorable vibration conditions so that a secure operation can take place.

The sectional view also shows that both the first clip arm 11 and the second clip arm 12 are configured in order to run round more than half the circumference of the respective pipelines 5, 6. The pipelines are consequently held secure in the respective clip arms 11,12. The enclosure round the respective pipe cross-section by the associated clip arm 11, 12 is here at most 5% more compared with just a half enclosure (i.e. the enclosure round 180° in the circumferential direction of the pipe cross-section). According to the invention this enables the respective pipelines 5, 6 to be clipped into the associated clip arm ends 15, 16 and be held substantially more secure therein.

FIG. 3 shows a further embodiment of the pipeline system 40 or fuel pipeline system 50 according to the invention which has a further embodiment of the connecting clip 1 according to the invention. The fuel pipeline system 50 can also be a part of a gas turbine, which is not shown in further detail. The connecting clip 1 shown in FIG. 3 differs from the connecting clips 1 shown in the previous figures in that the clip arm ends 15, 16 which are not connected by the damping element 20 are provided in a hooked connection with one another. The clip arm ends 15, 16 are provided at least in part with a flange wherein the respective flanges of the associated clip arm ends 15, 16 are each formed to fit into one another. As a result the two flanges can engage in one another in order to form the hooked connection. This hooked connection can be easily released again by suitable mechanical handling so that the complete connecting clip 1 can be easily removed again from the pipelines 5, 6.

FIG. 4 shows a lateral sectional view through the embodiment of the pipeline system 40, or fuel pipeline system 50, illustrated in FIG. 3. The hooked connection of the two clip arm ends 15, 16 can be clearly seen here.

Further embodiments are apparent from the dependent claims.

The invention claimed is:

1. A connecting clip for connecting two pipelines, comprising:
   a first clip arm which is configured to run at least partially round a circumference of a first pipeline, and
   a second clip arm which is configured to run at least partially round a circumference of a second pipeline,
   wherein the first clip arm and the second clip arm are connected to one another in damping manner at a connection, the connection comprising a damping element interposed between the first clip arm and the second clip arm wherein the damping element comprises at least one metal wire mat, and
   wherein a tightening of the connection draws the first clip arm and the second clip arm together, thereby drawing the first pipeline and the second pipeline together.

2. The connecting clip, as claimed in claim 1,
   wherein the first clip arm is configured to run over more than half of the circumference of the first pipeline and/or the second clip arm is configured to run over more than half the circumference of the second pipeline.

3. The connecting clip, as claimed in claim 1,
   wherein the first clip arm is connected in a region of one clip arm end to the second clip arm likewise in a region of one clip arm end, wherein two other clip arm ends of the two clip arms remain unconnected with one another.

4. The connecting clip, as claimed in claim 1,
   wherein the first clip arm is connected in a region of one clip arm end to the second clip arm likewise in a region of one clip arm end, wherein two other clip arm ends of the two clip arms can be brought into a releasable hooked connection with one another.

5. The connecting clip, as claimed in claim 1,
wherein the first clip arm is connected in a region of one clip arm end to the second clip arm likewise in a region of one clip arm end, and wherein two other clip arm ends of the two clip arms are likewise connected to one another in a damping manner.

6. The connecting clip, as claimed in claim 1,
wherein the first clip arm is connected in a region of one clip arm end to the second clip arm likewise in a region of one clip arm end so that the two clip arms are provided connected to one another at least in some regions indirectly via the damping element.

7. The connecting clip, as claimed in claim 6,
wherein each clip arm end comprises a recess through which a retaining pin is passed for connecting the clip arm ends together.

8. The connecting clip, as claimed in claim 7,
wherein the damping element likewise comprises a hole through which the retaining pin passes.

9. The connecting clip, as claimed in claim 7,
wherein the retaining pin is configured as a threaded pin which is tensioned with the two clip arm ends.

10. A pipeline system comprising:
the first pipeline and the second pipeline which are connected by means of the connecting clip as claimed in claim 1.

11. A fuel pipeline system of a gas turbine plant comprising:
the first pipeline for conveying fuel and the second pipeline for conveying fuel which are both connected by means of the connecting clip as claimed in claim 1.

12. A gas turbine comprising:
a fuel pipeline system as claimed in claim 11.

13. A connecting clip, comprising:
a first clip arm comprising a first clip pipeline end configured to cradle a first pipeline and a first clip fastener end;
a second clip arm comprising a second clip pipeline end configured to cradle a second pipeline and a second clip fastener end;
a metal wire mat interposed between the first clip fastener end and the second clip fastener end; and
a fastener arrangement configured to clamp the metal wire mat between the first clip fastener end and the second clip fastener end, and configured to clamp the first clip pipeline end and the second clip pipeline end onto a stacked arrangement of the first pipeline and the second pipeline, thereby biasing the first pipeline and the second pipeline toward each other.

14. The connecting clip of claim 13, wherein the first clip fastener end comprises a hole therethrough, the second clip fastener end comprises a hole therethrough, the metal wire mat comprises a hole therethrough, and wherein the fastener arrangement comprises a retaining pin that passes through each hole.

15. The connecting clip of claim 13, wherein the first clip arm traps the first pipeline therein, and wherein the second clip arm traps the second pipeline therein.

* * * * *